May 8, 1928.
W. DE BACK
1,668,804
DISTRIBUTING SPOUT
Filed June 12, 1926
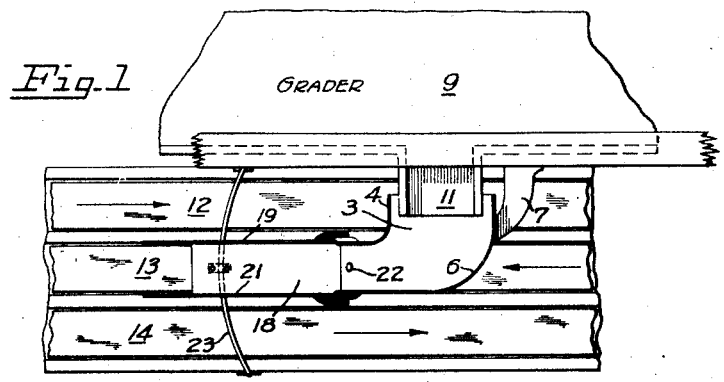
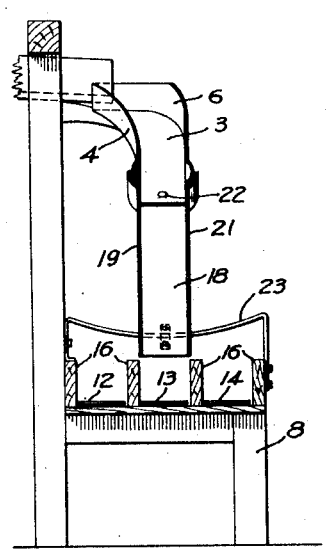
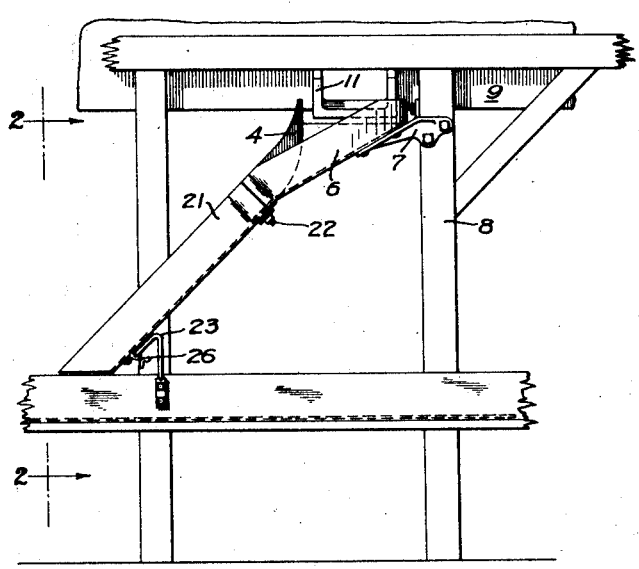
INVENTOR
WILLIAM DE BACK
BY Charles S. Evans
HIS ATTORNEY.

Patented May 8, 1928.

1,668,804

UNITED STATES PATENT OFFICE.

WILLIAM DE BACK, OF SAN LEANDRO, CALIFORNIA.

DISTRIBUTING SPOUT.

Application filed June 12, 1926. Serial No. 115,636.

My invention relates to the handling and distribution of fruit, especially fruit which has been sorted in a grader and is to be transferred from the grader spout to a selected conveying or other receiving means.

In the canning of fruit it is customary first to grade it as to size, and then to transfer each size of fruit to a separate storage or processing receiver. In the past it has been customary to shunt the fruit from one receiver to another by means of baffles in the delivery conduits. These baffles have not been found to be wholly satisfactory and it is therefore one of the objects of my invention to provide a movable spout which may be fixed to discharge upon any selected one of a number of receiving means.

Another object of my invention is to provide a swinging spout having a joint embodying a continuous guide channel for the fruit regardless of the angular position of the spout.

My invention possesses other objects and features of advantage some of which, with the foregoing, will be set forth in the following description of my invention which is illustrated in the drawings accompanying and forming part of the specification. It is to be understood that I do not limit myself to the showing made by the said description, as I may adopt variant forms of my invention within the scope of the claims.

Referring to the drawings:

Figure 1 is a plan view of the grader spout of my invention in operative position with regard to the grader table and the receiving conveyors, which are indicated generally. Figures 2 and 3 are respectively front and side elevations of the same.

Broadly stated the device of my invention comprises a relatively fixed spout in series with the fruit grader and a pivoted conduit or spout leading from the fixed spout to receiving conveyors, for delivering the fruit to any selected one of the conveyors. A supporting guide rail is provided for the swinging spout and a clamp is provided to secure the spout in adjusted position. Curved flanges on the pivotally connected ends of the two spouts cooperate to form a continuous guide channel regardless of the position of the pivoted spout.

In terms of greater detail, my invention comprises a fixed channel or spout, formed of an inclined base 3 and side walls 4 and 6; which is secured by a bracket 7 to a convenient portion of the framework 8 of a fruit grader, indicated generally by the numeral 9. The grader is of well known construction and discharges the graded fruit from a plurality of shaker spouts 11, one of which is shown in the drawings. As is common in such a device, the grader is reciprocated longitudinally, and so the fixed spout is formed broad enough at its inlet to encompass the shaker spout thruout the reciprocating movement of the latter.

In order to distribute the fruit to a selected one of the receiving conveyors 12, 13, and 14, which are of the conventional endless belt type running between the guard rails 16, a pivoted channel or conduit formed of an inclined base 18 and side walls 19 and 21, is provided. A pivot pin 22 passing thru the bases 3 and 18 connects the end of this movable channel, to the end of the fixed channel. The lower end of the pivoted channel is supported on an arcuate guide bar 23 approximately concentric to the pivot pin and conveniently mounted on the guard rails. The bar passes thru a bracket fixed on the spout, and a thumb screw 26 on the bracket may be tightened to secure the channel in adjusted position over one of the receiving conveyors 12, 13 or 14.

Special means are provided for guiding the fruit at the intersection of the fixed and pivoted channels; for if the side walls 4, 6, 19 and 21 of the two channels were merely cut short so as to permit angular movement between the two, it is likely that fruit rolling down the incline of the channel would strike a projecting corner of one of the side walls at this joint and become bruised. Therefore the ends of these side walls adjacent the pivot point are curved approximately concentric to each other and to the pivot point, so that when assembled, the curved end of walls 19 and 21 envelop the end walls 4 and 6 in all positions of angular adjustment of the pivoted channel.

It is an important purpose of this invention to displace the old type of spout or channel with a new and improved type, without altering other existing structure. The grader and conveyors have consequently not been described in detail since I make no claim to their specific features; they being old and of construction well-known to those skilled in the art.

I claim:

1. In combination with a fruit grader having a shaker spout, a fixed channel for receiving the fruit which has been graded and in communication with the shaker spout, a plurality of receiving means for the graded fruit, a movable channel in communication with the fixed channel, and means for adjusting the movable channel to distribute the fruit to a selected receiving means.

2. In combination with a fruit grader having a shaker spout, a fixed channel for receiving the fruit which has been graded and in communication with the shaker spout, a plurality of receiving means for the graded fruit, and a movable channel in communication with said fixed channel and adjustable to distribute the fruit to a selected receiving means, said channels being formed with cooperating walls whereby a continuous channel is provided from the fixed channel to the receiving means.

3. In combination with a fruit grader having a spout for delivering the fruit which has been graded, a plurality of receiving means for the graded fruit, and a pivoted conduit for distributing the fruit from said spout to a selected receiving means.

4. In combination with a fruit grader having a spout for delivering the fruit which has been graded, a plurality of receiving means for the graded fruit, a fixed channel leading from said spout, a movable channel for distributing the fruit from said spout to a selected receiving means, and a pivot connecting said channels, each of said channels being formed with walls having cooperating extensions concentric to the pivot for retaining the fruit in said channels.

5. In a fruit grader, a spout for delivering the fruit which has been graded, a plurality of receiving means for the graded fruit, a pivotally adjustable conduit for distributing the fruit from said spout to a selected receiving means, an arcuate guide rail for said pivoted conduit, and means for locking the conduit to the guide rail in adjusted position.

6. In combination with a fruit grader having a spout for delivering the fruit which has been graded, a plurality of receiving means for the graded fruit, and a pivoted conduit for distributing the fruit from said spout to a selected receiving means, and means for securing said conduit in selected position.

7. In a fruit grader, a fixed spout for receiving the fruit from the grader, a plurality of conveyors for the graded fruit, a pivotally adjustable channel for distributing the fruit from said spout to a selected conveyor, an arcuate guide rail, a bracket on said channel and engaged with said rail, and clamp means between said bracket and rail for securing the channel in adjusted position.

In testimony whereof, I have hereunto set my hand.

WILLIAM DE BACK.